(12) United States Patent
Thomas

(10) Patent No.: US 6,968,132 B1
(45) Date of Patent: Nov. 22, 2005

(54) MULTIPLEXING AND DE-MULTIPLEXING OPTICAL SIGNALS

(75) Inventor: Mark Thomas, Petaluma, CA (US)

(73) Assignee: Mahi Networks, Inc., Petaluma, CA (US)

( * ) Notice: Subject to any disclaimer, the term of this patent is extended or adjusted under 35 U.S.C. 154(b) by 708 days.

(21) Appl. No.: 09/859,340

(22) Filed: May 16, 2001

Related U.S. Application Data

(60) Provisional application No. 60/204,917, filed on May 16, 2000.

(51) Int. Cl.[7] ............................................... G02B 6/28
(52) U.S. Cl. ........................ 398/53; 398/102; 398/81; 398/183
(58) Field of Search ......................... 398/29, 53, 81, 398/158, 102, 161, 183

(56) References Cited

U.S. PATENT DOCUMENTS

| | | | | |
|---|---|---|---|---|
| 5,559,920 A | * | 9/1996 | Chraplyvy et al. | ............ 398/81 |
| 5,625,479 A | * | 4/1997 | Suzuki et al. | ................. 398/98 |
| 5,877,879 A | * | 3/1999 | Naito | ........................... 398/91 |
| 5,946,119 A | * | 8/1999 | Bergano et al. | ................ 398/91 |
| 6,292,603 B1 | * | 9/2001 | Mizuochi et al. | ............. 385/24 |
| 6,304,691 B1 | * | 10/2001 | Espindola et al. | ............ 385/24 |
| 6,661,974 B1 | * | 12/2003 | Akiyama et al. | ............. 398/95 |
| 6,731,877 B1 | * | 5/2004 | Cao | ............................ 398/91 |

\* cited by examiner

*Primary Examiner*—M. R. Sedighian
*Assistant Examiner*—David C. Payne
(74) *Attorney, Agent, or Firm*—Blakely Sokoloff Taylor & Zafman LLP

(57) ABSTRACT

Methods and apparatus are contemplated for multiplexing and de-multiplexing modulated optical signals using dispersion. Optical signals comprising a wavelength-multiplexed plurality of modulated spectra may be additionally multiplexed and de-multiplexed using dispersion. Dispersion multiplexing may be used in the simultaneous two-way propagation of optical signals over a waveguide.

6 Claims, 12 Drawing Sheets

US 6,968,132 B1

MULTIPLEXING AND DE-MULTIPLEXING OPTICAL SIGNALS

This U.S. Patent application claims the benefit of U.S. Provisional Application No. 60/204,917, filed May 16, 2000.

FIELD

The field of interest is optical networking.

BACKGROUND

Multiplexing and de-multiplexing of optical signals, for transmission over a common waveguide, can be accomplished by a variety of methods and apparatus. Common methods include Optical Frequency Division Multiplexing and Optical Code Division Multiplexing Access.

New methods and apparatus for multiplexing of optical signals would enable a higher density of data to be transmitted over a common waveguide.

SUMMARY OF THE INVENTION

Methods and apparatus are contemplated for multiplexing and de-multiplexing modulated optical signals using dispersion. Optical signals comprising a wavelength-multiplexed plurality of modulated spectra may be additionally multiplexed and de-multiplexed using dispersion. Dispersion multiplexing may be used in the simultaneous two-way propagation of optical signals over a common waveguide.

BRIEF DESCRIPTION OF DRAWINGS

The invention is illustrated by way of example, and not by way of limitation, in the figures of the accompanying drawings in which like reference numerals refer to similar elements.

DETAILED DESCRIPTION

Methods and apparatus for multiplexing and de-multiplexing optical signals are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearance of the phrase "in one embodiment" in various places in the specification does not necessarily refer to the same embodiment.

Figure 1:
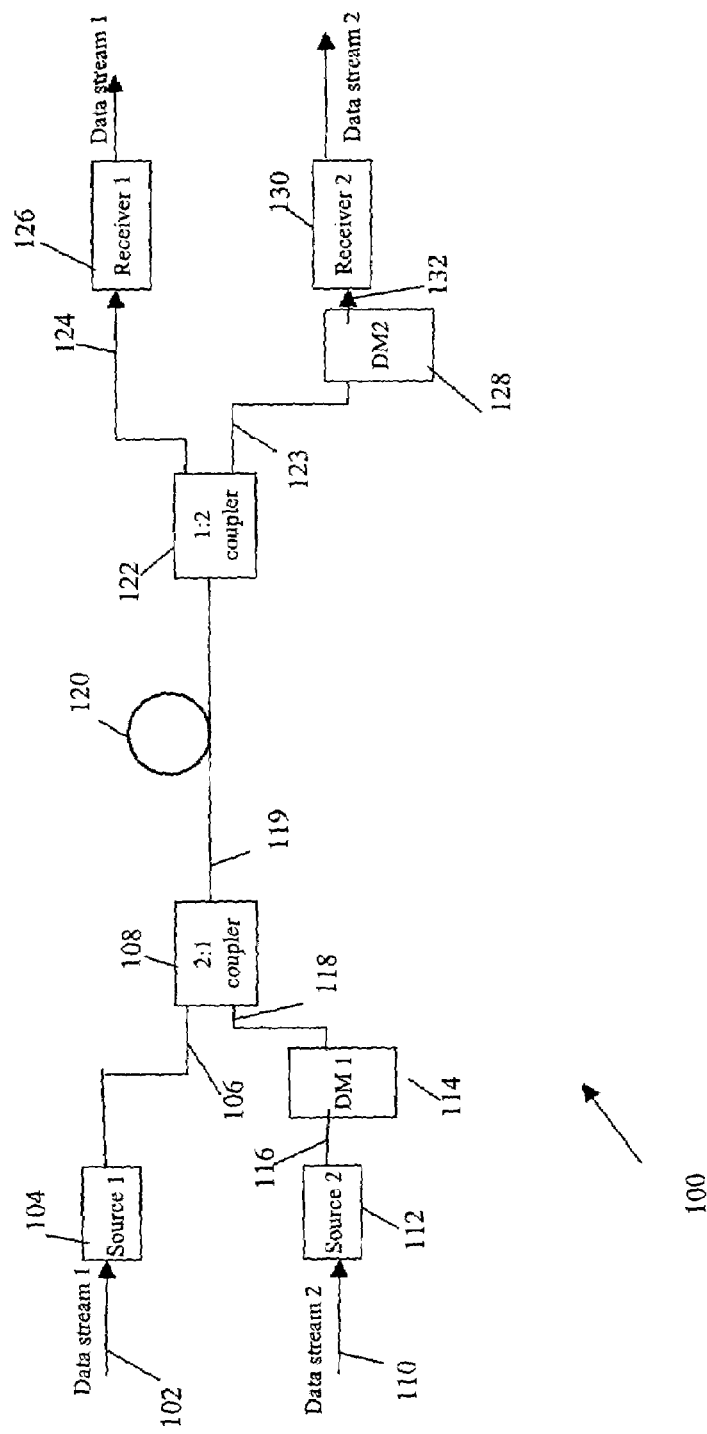
FIG. 1 shows a block diagram of a two-channel multiplexing transmission system, according to an embodiment of the invention.

FIG. 1 depicts, in block diagram form, an embodiment of the invention 100 which uses dispersion multiplexing to transmit two signals over a common transmission waveguide. A first data stream 102 modulates a first optical signal source 104 comprising a spectrum of wavelengths substantially centered about a central wavelength with a narrow spread of power around the central wavelength (a spectrum of wavelengths substantially centered about a central wavelength with a narrow spread of power around the central wavelength is referred to herein as a "spectrum"; the plural of spectrum, comprising more than one spectrum, is referred herein to as "spectra"), producing a first modulated spectrum 106, which is input to a first coupler 108. A second data stream 110 modulates a second spectrum source 112 producing a second modulated spectrum 116, which is input to a first dispersion module 114. A signal 118 output from the first dispersion module 114 comprises a processed second modulated spectrum, which feeds into the first coupler 108. The output of the first coupler 108 is a combined signal 119.

Figure 2:
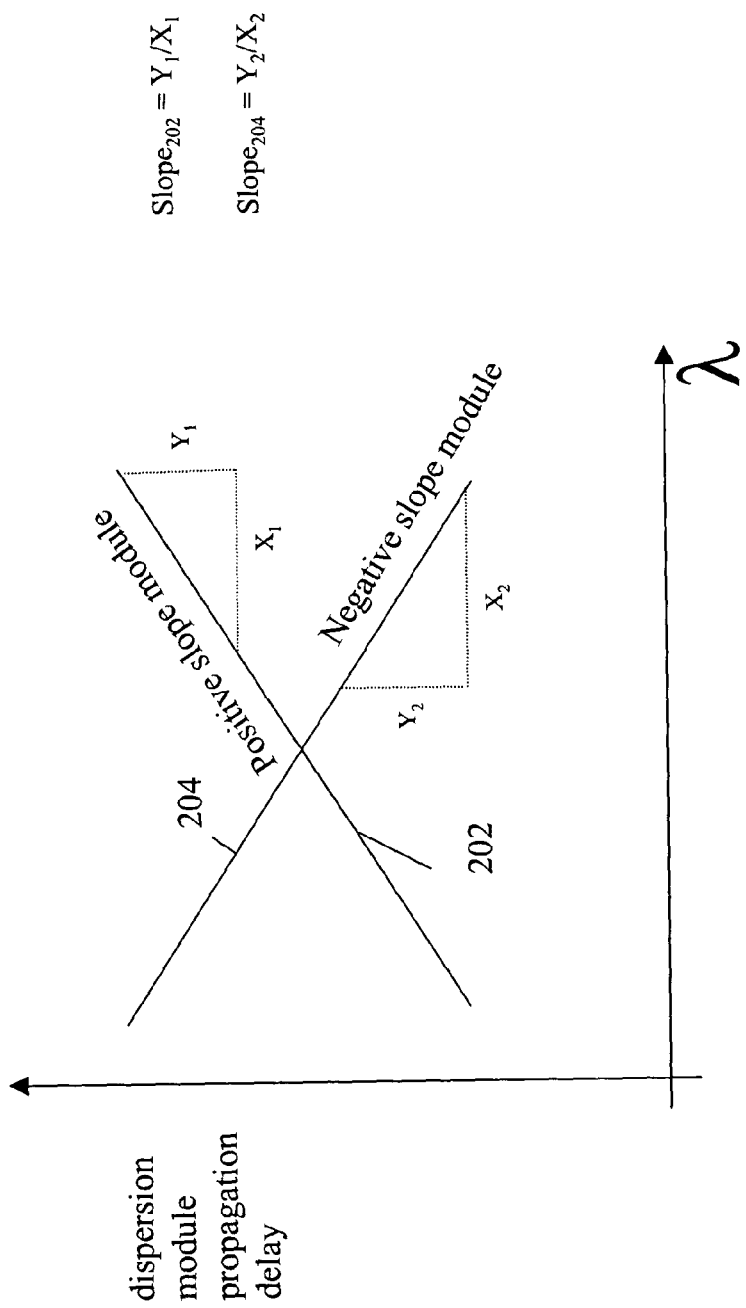
FIG. 2 (prior art) shows graphs of propagation delay as a function of wavelength for two dispersion modules.

The first and second modulated spectra 106, 116, each comprises a band of wavelengths that includes a substantially carrier spectrum and sidebands resulting from modulation of the carrier spectrum. The first dispersion module 114 applies a propagation delay to each wavelength component of the second modulated spectrum 116, according to a scheme such as a curve 202 which is linear with positive slope, shown in FIG. 2.

Figure 3:
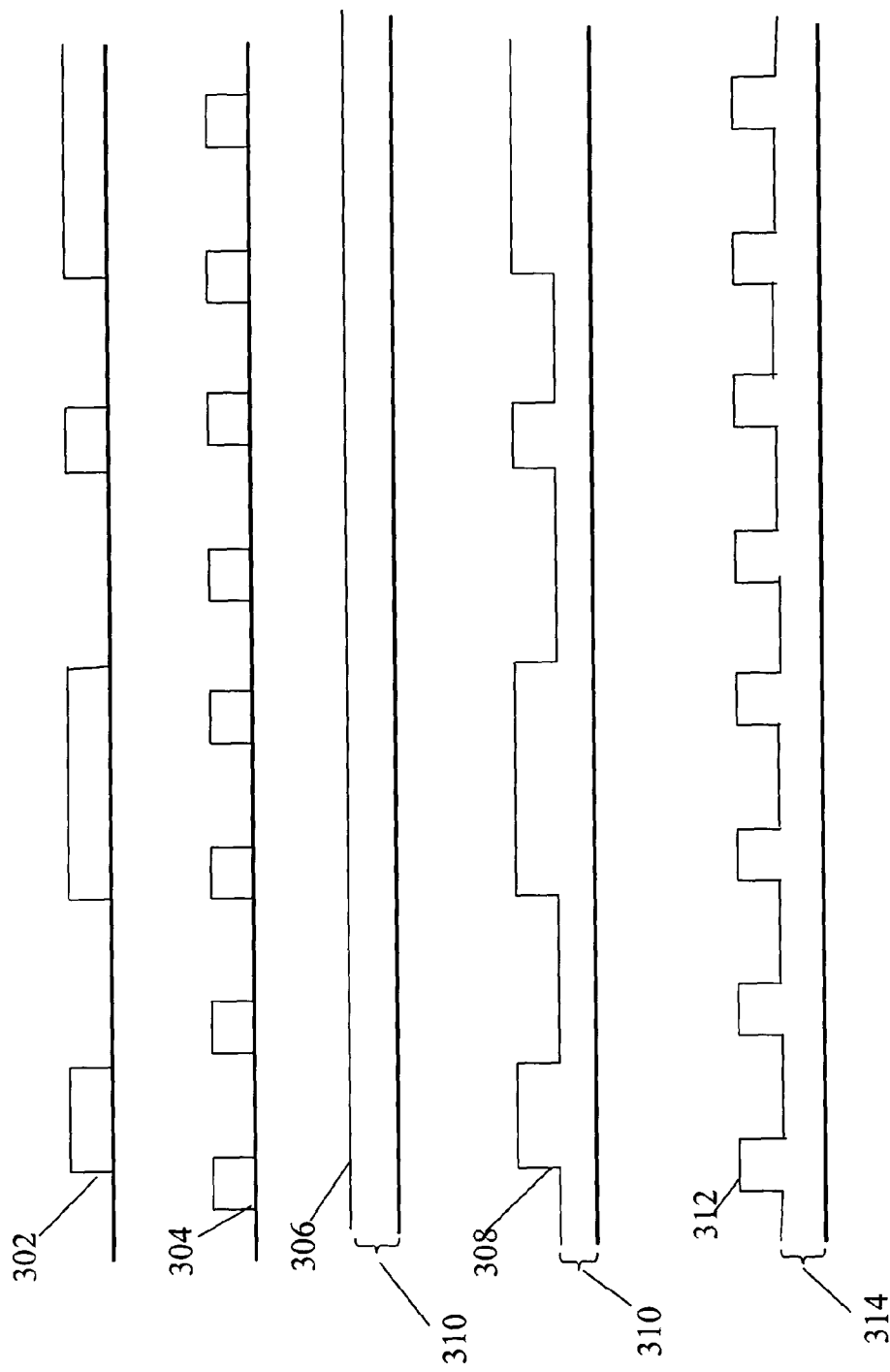
FIG. 3 shows graphs of waveforms at various points of FIG. 1, according to an embodiment of the invention.

FIG. 3 shows a waveform 304 of the second modulated spectrum 116. The first dispersion module 114 imparts propagation delay in proportion to the wavelength λ of each respective component of the second modulated spectrum. As a result, the total signal amplitude (obtained by integrating at any given instant of time, signal amplitude over all wavelengths, also called "wavelength-integrated signal amplitude" herein) of the processed second modulated spectrum 118 is substantially constant over time. Hence a waveform 306 of the processed second modulated spectrum 118 is substantially flat, i.e., the wavelength-integrated signal amplitude is constant over time.

FIG. 3 also shows a waveform 302 of the first modulated spectrum 106, and a waveform 308 of the combined signal 119 output from the first coupler 108. The waveform 308 is the sum of the waveform 302 of the first modulated spectrum 106 and the waveform 306 of the processed second modulated spectrum 118. Comparing the waveform 306 and the waveform 304 shows that processing by the first dispersion module 114 effectively "hides" the data encoded on the second modulated spectrum 116, producing a waveform that is constant over time. In this illustration, the waveform 308 of the combined signal 119 is similar to that of the waveform 302, with the addition of an offset by the constant amplitude 310 of waveform 306. Therefore the processed second modulated spectrum 118 and the first modulated spectrum 106 do not interfere with or distort one another as the two signals are transmitted simultaneously over a transmission waveguide 120.

Returning back to FIG. 1, the first modulated spectrum 106 and the processed second modulated spectrum 118 are combined in the first coupler 108 into a combined signal. An output signal 119 of the first coupler 108 propagates over the transmission waveguide 120. The combined signal 119 is then input into a second coupler 122 which divides the combined signal 119 into two portions. A first portion 124 of the combined signal 119 is fed into a receiver 126 to decode the first portion 124. As the combined signal 119 comprises a waveform that is substantially equivalent to the waveform 302 plus a direct current offset 310 (also called d.c. offset herein) from the waveform 306, the receiver 126 detects only the data modulated onto the first modulated signal 106, to output the data as shown in the waveform 302. A second portion 123 of the combined signal 119 is received by a second dispersion module 128. The second dispersion module 128 has a negative slope characteristic curve such as a curve 204 of FIG. 2, which curve represents an inverse transfer function to that of the positive slope module curve 202.

If $P(\lambda)$ represents the first dispersion module transfer function that acts on a function $F(\lambda)$, $P'(\lambda)$ represents the second dispersion module transfer function, i.e., the inverse transfer function, then when P' acts upon $P[F(\lambda)]$, $$P' \cdot P[F(\lambda)] \cong F(\lambda)$$

Hence, the effect of the second dispersion module transfer function acting upon the modulated spectra that have been processed by the first dispersion module transfer function, is to reproduce the original modulated spectra.

The second portion 123 of the combined signal 119, when processed by the second dispersion module 128, produces an output signal 132 with a waveform 312 that has substantially the same shape as waveform 304, but is offset by a constant offset 314. The constant offset 314 arises from processing the part of the signal 119 originating from the first modulated spectrum 106, which, because it was not processed by the first dispersion module 114, is simply smoothed to a constant value by the second dispersion module 128. The output 132 of the second dispersion module is input to a second receiver 130, which decodes the information that was originally encoded on the second modulated signal 116, and effectively ignores the offset 314. As can be seen, the first data stream 102 is therefore transmitted through the system 100 and is decoded and output by the first receiver 126; the second data stream 110 is transmitted through the system 100 and is decoded and output by the second receiver 130.

Figure 4:
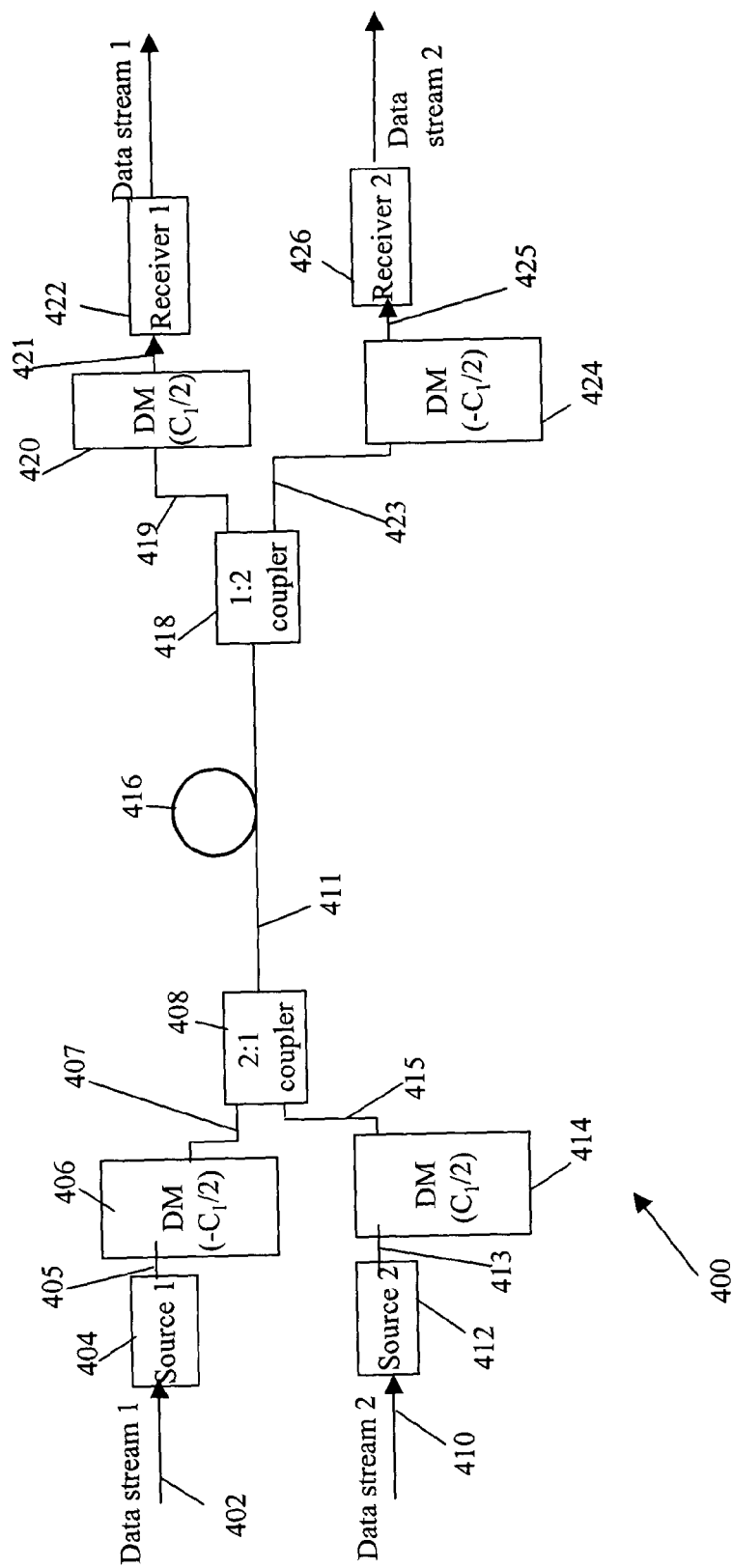
FIG. 4 shows a block diagram of a two-channel multiplexing transmission system, according to another embodiment of the invention.

Another embodiment of the invention is shown in FIG. 4. In this embodiment, a first data stream 402 modulates a first spectrum source 404, producing a first modulated spectrum 405 that is input to a first dispersion module 406, which in this illustration comprises, for example, a negative linear characteristic curve of slope ($-C_1/2$), such as curve 204 (FIG. 2), the slope of which is calculated as $Y_2/X_2$. A processed first modulated spectrum 407 is output from the first dispersion module 406, and is received by first coupler 408. A second data stream 410 modulates a second spectrum source 412 to produce a second modulated spectrum 413 that is input to a second dispersion module 414 comprising, for example, a positive linear characteristic curve of slope ($+C_1/2$), such as curve 202 (FIG. 2), the slope of which is calculated as $Y_1/X_1$. A processed second modulated spectrum 415 is output from the second dispersion module, which is received by the first coupler 408. While the processed first modulated spectrum 407 and the processed second modulated spectrum 415 each retain the respective data that was encoded on their respective spectrum sources, each comprises a wavelength-integrated amplitude that is substantially constant in time.

The processed first modulated spectrum 407 and processed second modulated spectrum 415 are combined in the first coupler 408 to produce a combined signal 411 that propagates over a transmission waveguide 416. The combined signal 411 is received by a second coupler 418, which divides the combined signal 411 into a first portion 419 and a second portion 423. The first portion 419 is input into a third dispersion module 420 comprising a positive linear characteristic curve of slope ($+C_1/2$), which slope is the inverse of the characteristic curve of the first dispersion module 406. The first portion 419, comprising a mixture of the processed first modulated spectrum 407 and the processed second modulated spectrum 415, when processed by the third dispersion module 420, produces an output signal 421 substantially comprising the first modulated spectrum 407, plus a substantially constant d.c. offset resulting from the processing by the third dispersion module 420 of the processed second modulated spectrum 415.

A first receiver 422 receives output signal 421, decoding the first data stream 402 encoded on the first modulated spectrum 405, and effectively ignoring the second data stream 410 encoded on the second modulated spectrum 413, which is seen to be a d.c. offset that is constant in time.

The second portion 423 is input to a fourth dispersion module 424 comprising, for example a negative linear characteristic curve of slope ($-C_1/2$), which is the inverse of the characteristic curve of the second dispersion module 414. (The respective slopes of the second dispersion module 414 and the fourth dispersion module 424 are inverses of one another, and not necessarily equal to the respective slopes of the third dispersion module 420 and the first dispersion module 406. The respective slopes of the second dispersion module 414 and the fourth dispersion module 424 may be, for example, $-C_a/2$ and $+C_a/2$, where Ca may have any value.) The second portion 423, when processed by the fourth dispersion module 424, produces an output signal 425 substantially comprising the second modulated spectrum 413, plus a constant d.c. offset from the processed first modulated spectrum 407. The slope of the fourth dispersion module 424 is not the inverse of the slope of the first dispersion module 406; hence the processing by the fourth dispersion module 424 of the processed first modulated spectrum 407 produces a curve of constant amplitude, which is a constant d.c. offset.

A second receiver 426 receives the output signal 425 from the fourth dispersion module 424, and decodes the data stream 410 encoded on the second modulated spectrum 413, and effectively ignoring data encoded on the processed first modulated spectrum 407.

Figure 5:
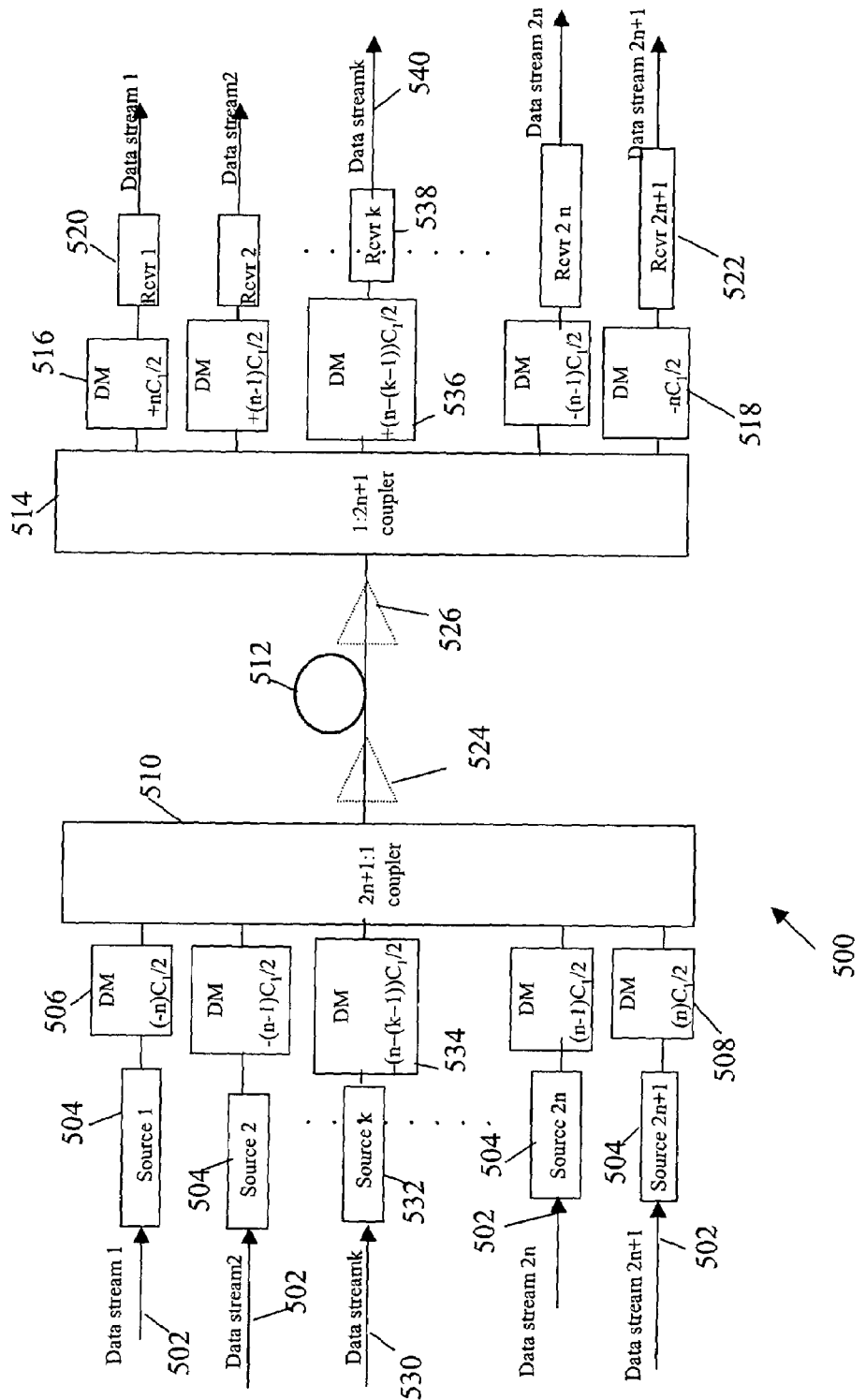
FIG. 5 shows a (2n+1)-channel dispersion multiplexing transmission system, according to an embodiment of the invention.

FIG. 5 shows another embodiment of the invention. For illustration purposes, the case of an odd number of data streams is shown; an even number of data streams may be considered in similar fashion. In the illustration, slopes of the dispersion modules are whole multiples of a slope ($C_1/2$); slope of a respective multiplexing dispersion module may in fact take on any value, with the corresponding inverse slope for a respective de-multiplexing dispersion module.

A plurality of 2n+1 data streams 502 modulate a plurality of respective optical sources 504. Each modulated spectrum is received by a respective multiplexing dispersion module 506, ... 534 ... 508, the $k^{th}$ multiplexing dispersion module comprising, for example, a linear characteristic curve of slope=$-(n-(k-1))(C_1/2)$, where $1 \leq k \leq 2n+1$, to output a respective $k^{th}$ processed modulated spectrum. A (2n+1:1) coupler 512 inputs the 2n+1 processed modulated spectra, and propagates on a transmission waveguide 512. The output of the transmission waveguide 512 is received by a (1:2n+1) coupler 514, which divides the combined signal into 2n+1 portions, each portion being input to a respective de-multiplexing dispersion module 516, ... 518. Each respective de-multiplexing dispersion module 516, ... 536, ... 518 comprises a linear characteristic curve of slope=$+(n-(k-1))(C_1/2)$, where $1 \leq k \leq 2n+1$, which slope is the inverse of the corresponding multiplexing dispersion module, e.g., the de-multiplexing dispersion module 516 comprises the inverse characteristic curve to that of the multiplexing dispersion module 506. The output of the $k^{th}$ de-multiplexing dispersion module 536, receiving the output of the (1:2n+1) coupler 514, is the $k^{th}$ modulated spectrum 540; all other modulated spectra that are processed by the $k^{th}$ de-multiplexing dispersion module produce a constant offset in the $k^{th}$ de-multiplexing dispersion module output. Each respective receiver 520, ... 538, ... 522 decodes a respective portion that is output from the corresponding respective de-multiplexing dispersion module 516, ... 536, ... 518, comprising the $k^{th}$ modulated spectrum offset by a constant offset amplitude, to output the $k^{th}$ data stream. Optional optical amplifiers 524, 526 may be added to boost the combined signal before and/or after transmission through the transmission waveguide 518.

Figure 6:
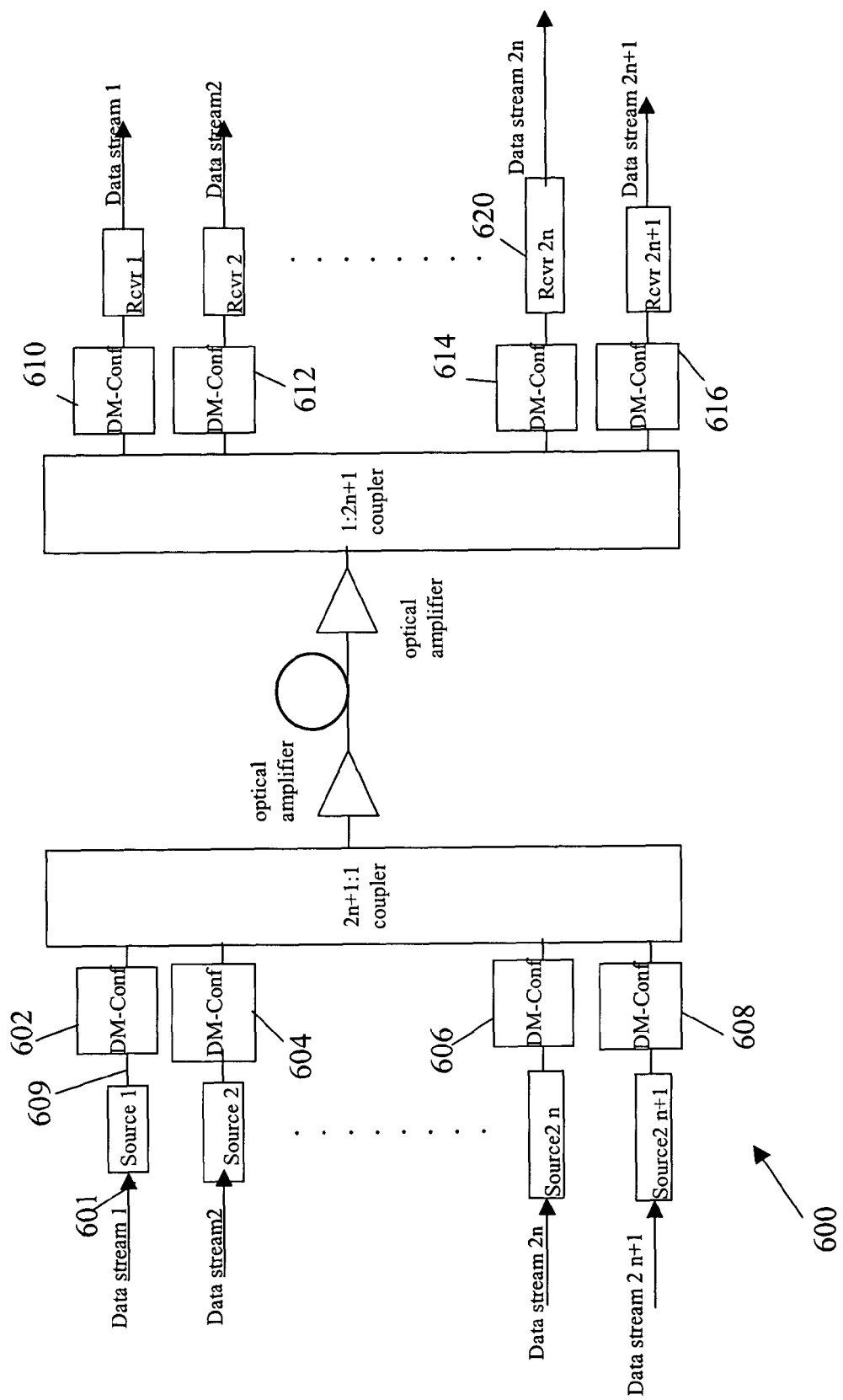
FIG. 6 shows a (2n+1)-channel dispersion multiplexing transmission system with configurable dispersion modules, according to an embodiment of the invention.

FIG. 6 shows a block diagram of an embodiment of the invention utilizing one or more configurable dispersion modules ("DM-Conf." herein). A configurable dispersion module is a dispersion module that allows the slope of the characteristic curve to be adjusted, for example, in discrete steps, or continuously, or by a combination of discrete steps and continuous variation. Through the use of configurable dispersion modules, a given data stream such as data stream 601, input to a given path including a given multiplexing configurable dispersion module such as a DM-Conf. 602, can be directed into any chosen receiver, such as receiver 620, by configuring the slope of the characteristic curve of the DM-Conf. 602 to be the inverse of, i.e., the negative of the value of, the slope of the characteristic curve of a corresponding de-multiplexing configurable dispersion module 614.

If, for example, the slope of the characteristic curve of the DM-Conf. 602 is configured to be a value Slope$_{602}$=X, then by setting the slope of the characteristic curve of the DM-Conf. 614 to a value Slope$_{614}$=−X, a modulated spectrum 609 will appear as input to the receiver 620 which will decode and output the data stream 601, all other modulated sources simply adding a d.c. offset to the signal input to receiver 620.

Figure 7:
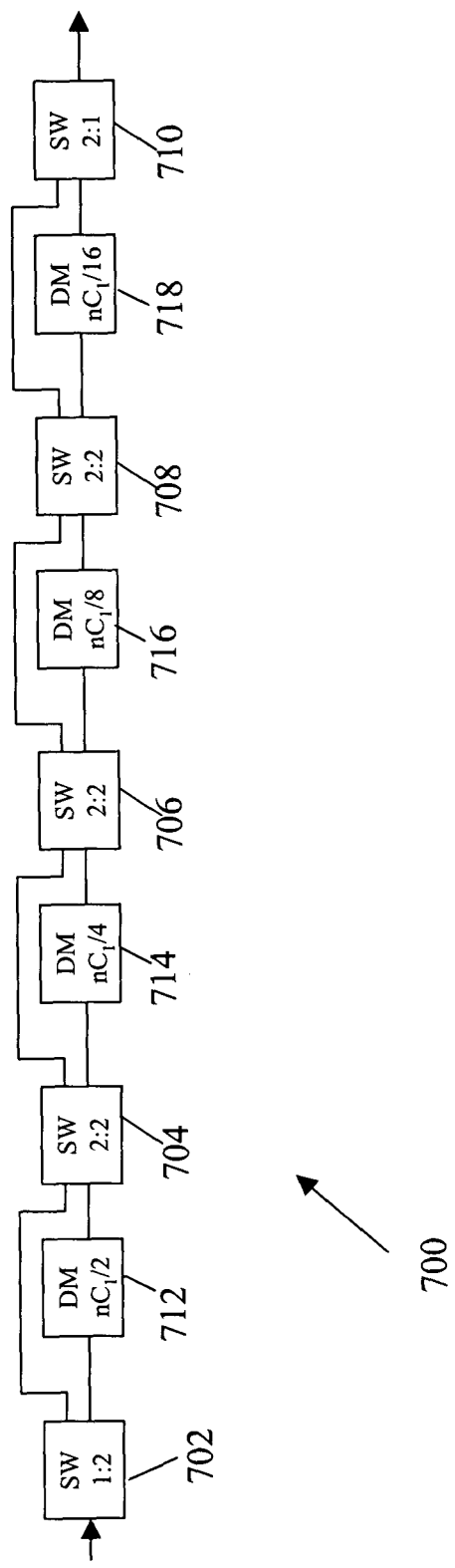
FIG. 7 shows a configurable dispersion module according to an embodiment of the invention.

A configurable dispersion module that is adjustable in discrete steps is shown in FIG. 7. The configurable dispersion module 700 comprises a set of respective switches 702, 704, 706, 708, 710, each of which enables a signal to be directed to either pass through, or to be processed by a respective fixed-slope dispersion module 712, 714, 716, 718. By configuring the switches 702, 704, 706, 708, 710 to direct an input signal to either bypass or input into one or more of the fixed-slope dispersion modules 712, 714, 716, 718, a discrete set of slopes for a signal passing through the configurable dispersion module 700 can be realized.

Figure 8:
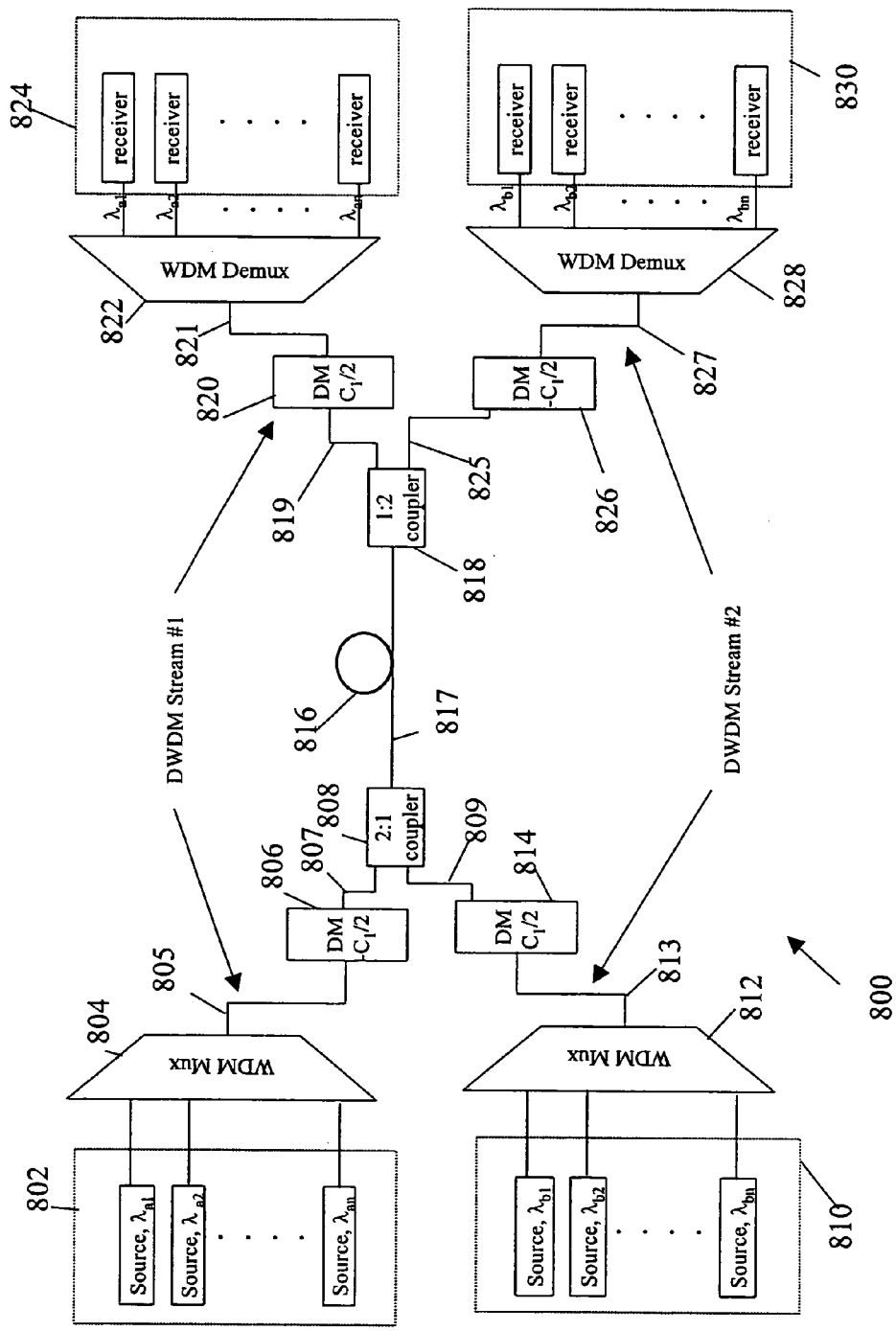
FIG. 8 shows a block diagram of dispersion multiplexing of two WDM streams, according to an embodiment of the invention.

The present invention may be used to process WDM multiplexed signals. FIG. 8 shows an embodiment wherein WDM multiplexed signals are dispersion multiplexed and dispersion-de-multiplexed. A first set of modulated spectra comprising respective carrier spectra $\lambda_{a1}, \ldots, \lambda_{an}$, is multiplexed in a WDM multiplexer 804 to output a first set of multiplexed spectra 805. The first set of multiplexed spectra 805 is input to a first dispersion module 806, which in this illustration comprises a negative linear characteristic curve of slope ($-C_1/2$). A processed first modulated multiplexed spectrum set 807 is output from the first dispersion module 806, and is input to a first coupler 808.

In similar fashion, a second set of modulated spectra 810, in this example comprising respective carrier spectra $\lambda_{b1}, \ldots, \lambda_{bn}$ that may or may not be substantially identical to those of the first set of modulated spectra 802, is multiplexed in a second WDM multiplexer 812 to output a second set of multiplexed spectra 813. The second set of multiplexed spectra 813 is input to a second dispersion module 814 comprising a positive linear characteristic curve of slope ($+C_1/2$). The output of the second dispersion module 814 is a processed second modulated multiplexed spectrum set 809 which is received by the first coupler 808. While the processed first modulated multiplexed spectrum set 807 and the processed second modulated multiplexed spectrum set 809 each retain the respective data encoded on the respective spectra of the respective spectrum sources, each appears to have a wavelength-integrated amplitude that is substantially constant in time.

The processed first modulated multiplexed spectrum set and the processed second modulated multiplexed spectrum set are combined in the first coupler 808 to produce a combined signal 817 that is propagated on a transmission waveguide 816. The combined signal 817 is received by a second coupler 818, which divides the combined signal into a first portion 819 and a second portion 825.

In similar fashion to the embodiment of FIG. 4, the first portion 819 is received by a third dispersion module 820 comprising a positive linear characteristic curve of slope ($+C_1/2$), the inverse of the characteristic curve of the first dispersion module 806. The combined signal, comprising a mixture of the processed first spectrum set 807 and the processed second spectrum set 809, when processed by the third dispersion module 820, produces an output signal 821 comprising the first modulated spectrum set 805; the second modulated spectrum set 813, when processed by the third dispersion module 820, results in a constant offset. A first de-multiplexer 822 receives the output signal 821, producing the first set of modulated spectra comprising respective carrier spectra $\lambda_{a1}, \ldots \lambda_{an}$. A first set of receivers 824 decodes data encoded on the respective modulated spectra of the first modulated spectrum set 802, effectively ignoring data encoded on the second modulated spectrum set 810, the latter appearing as a constant offset amplitude for each of the respective spectra $\lambda_{b1}, \ldots, \lambda_{bn}$.

The second portion 825 is input to a fourth dispersion module 826 comprising a negative linear characteristic curve of slope ($-C_1/2$), which is the inverse of the characteristic curve of the second dispersion module 814. The second portion 825, when processed by the fourth dispersion module 826, produces an output signal 827 comprising the second multiplexed modulated spectrum set 813. The first multiplexed modulated spectrum set 805, when processed by the fourth dispersion module 826, results in a constant offset, since the transfer function of the fourth dispersion module 826 is not the inverse of the transfer function of the first dispersion module 806. A second de-multiplexer 828 receives the output signal 827 from the fourth dispersion module 826, producing the second modulated spectrum set 810 comprising respective carrier spectra $\lambda_{b1}, \ldots, \lambda_{bn}$. A second set of receivers 830 decodes data encoded on the respective modulated spectra of the second modulated spectrum set 810, effectively ignoring data encoded on the first modulated spectrum set 802, the latter appearing as a d.c. offset (which offset may be of different offset amplitude for each spectrum) that is constant in time for each respective spectrum.

Figure 9:
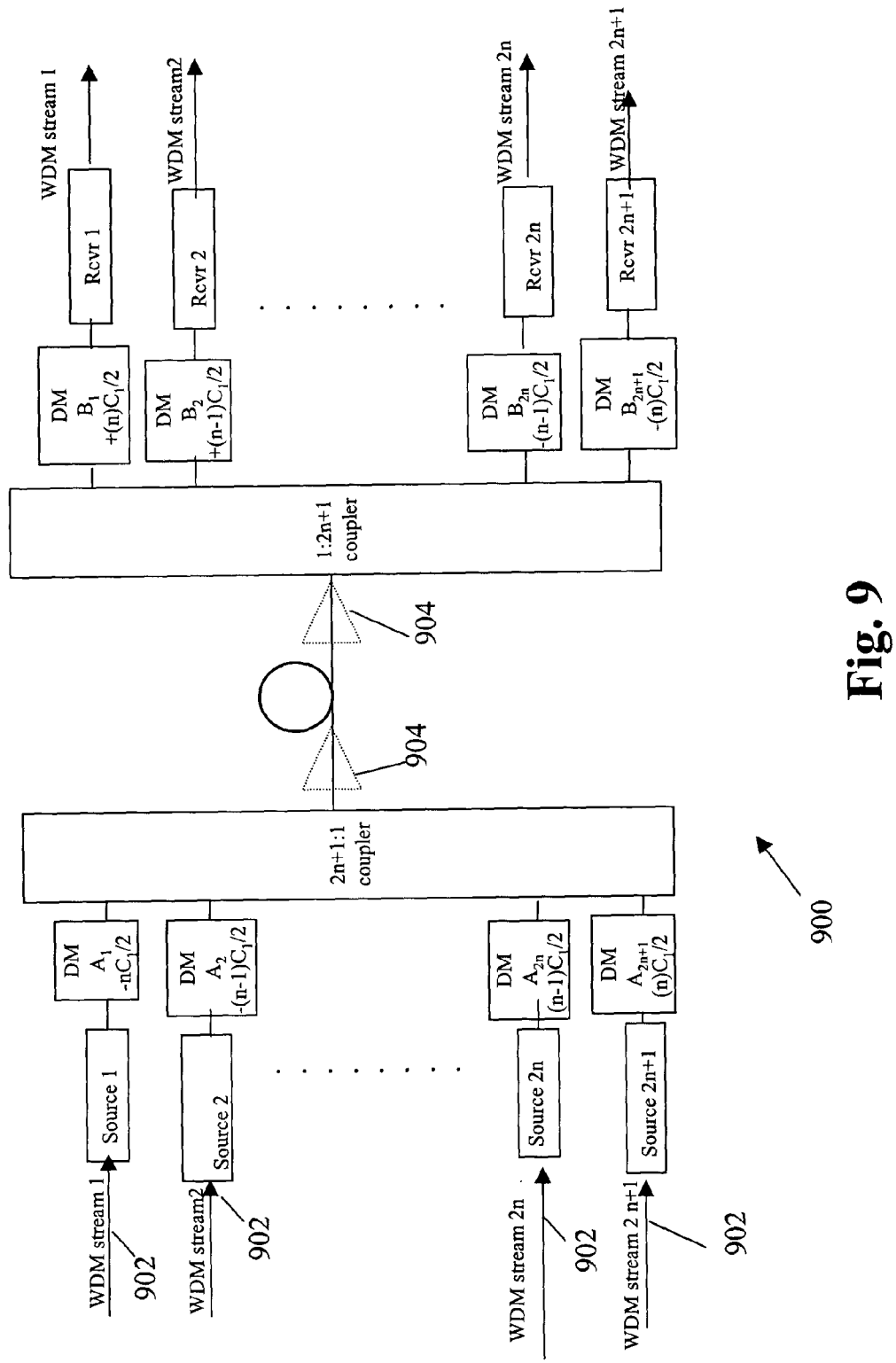
FIG. 9 shows a block diagram of dispersion multiplexing and de-multiplexing of 2n+1 streams, according to an embodiment of the invention.

FIG. 9 shows an embodiment of the invention that parallels that of FIG. 5; however, in this embodiment each input 902 comprises a WDM multiplexed set of modulated spectra. Here again, optional optical amplifiers 904 may be added to boost the combined signal along the transmission waveguide.

Figure 10:
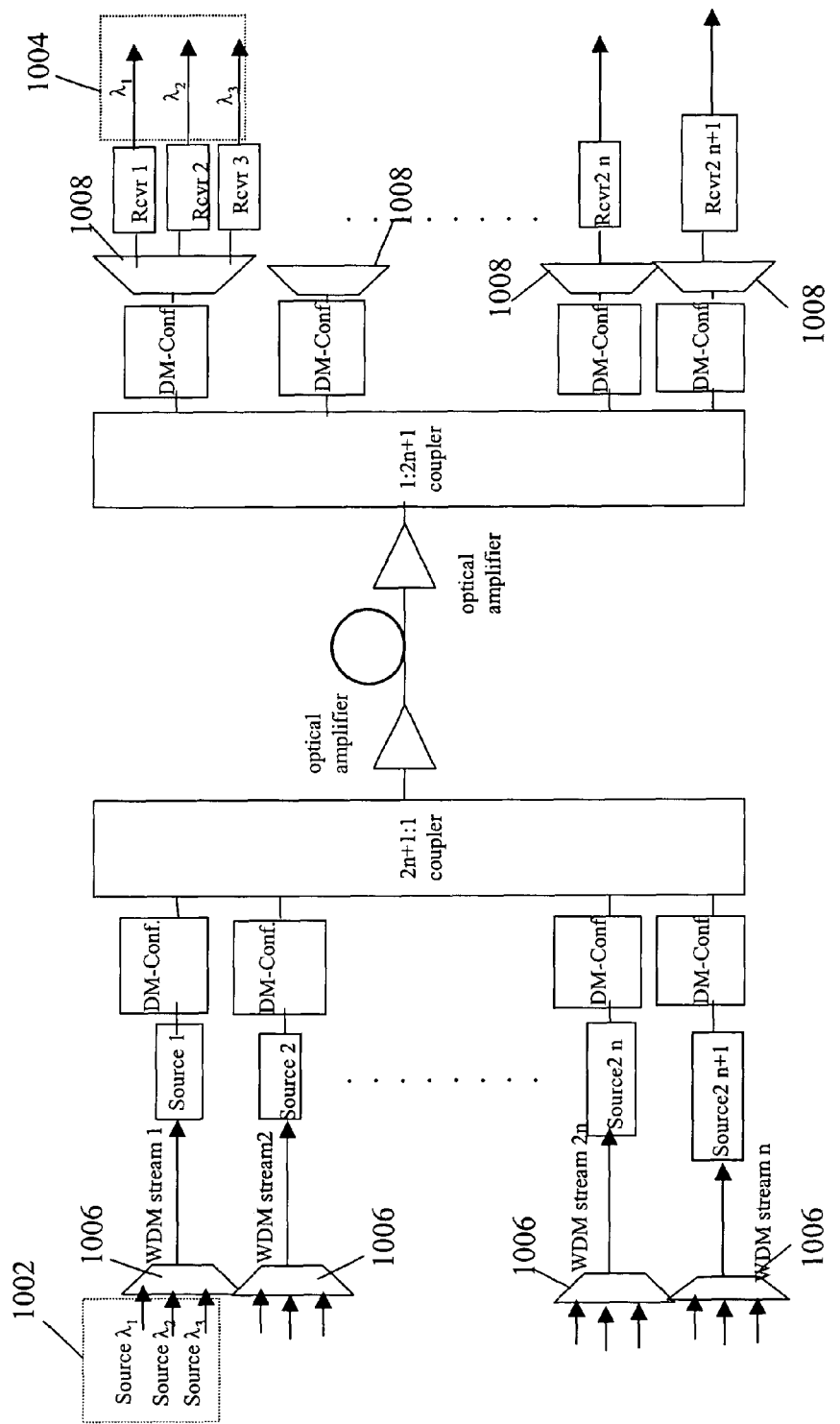
FIG. 10 shows a block diagram of dispersion multiplexing and de-multiplexing of 2n+1 streams using configurable dispersion modules, according to an embodiment of the invention.

FIG. 10 shows an embodiment of the invention that parallels that of FIG. 6, utilizing configurable dispersion modules; however in this embodiment, each input is a WDM multiplexed set of modulated spectra. Multiplexers 1006 and corresponding de-multiplexers 1008 are employed to respectively multiplex and de-multiplex respective spectrum sets, e.g., 1002, 1004.

Figure 11:
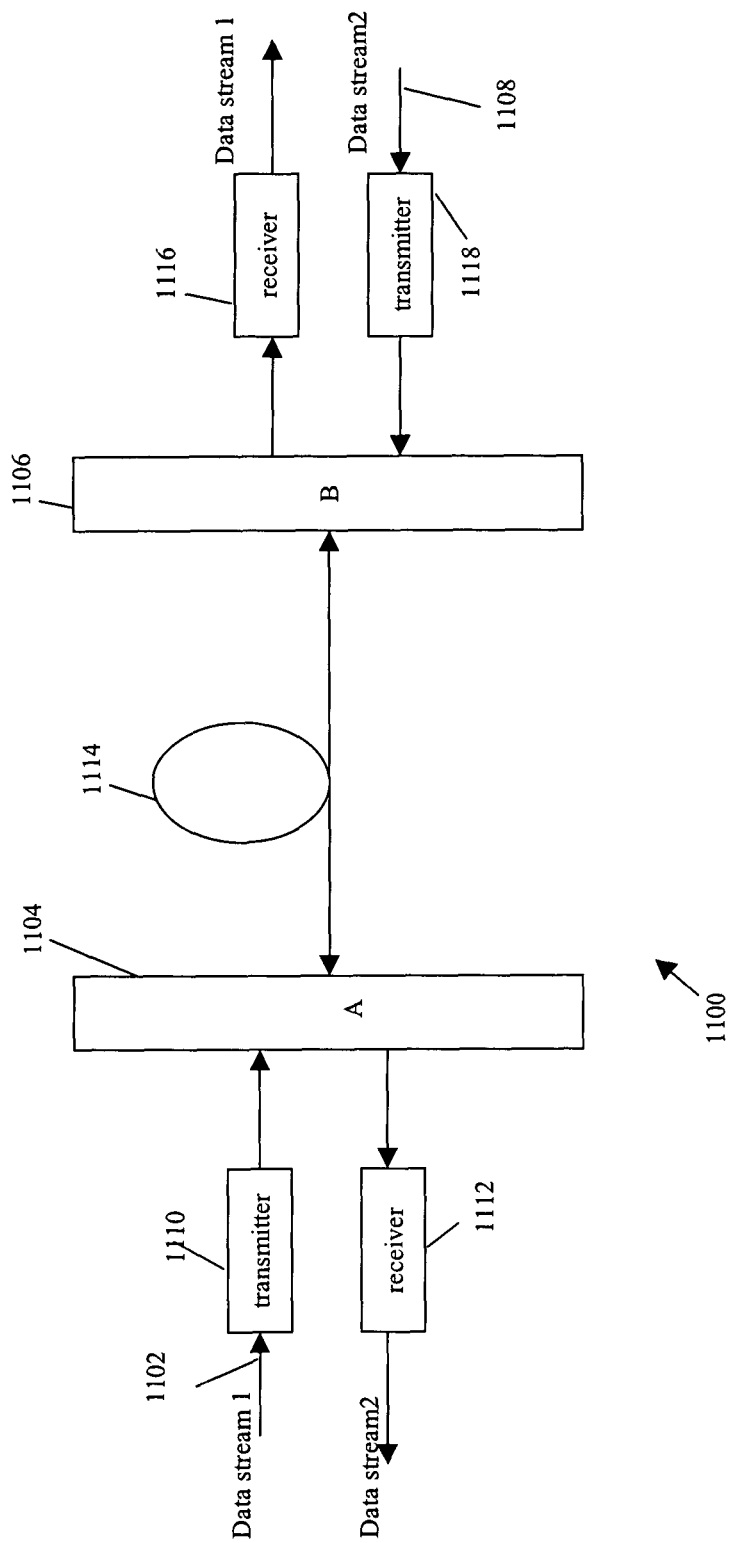
FIG. 11 (prior art) shows a block diagram of a bi-directional transmission system.

FIG. 11 (prior art) is a block diagram of a typical bi-directional transmission system 1100. A 1:2 coupler 1104 is used to couple a transmitter 1110 and a receiver 1112 to a transmission waveguide 1114. A 1:2 coupler 1106 couples a receiver 1116 and a transmitter 1118 to the transmission waveguide. In this arrangement, some of the energy from a data stream 1102 may interact with energy of a data stream 1108 due to reflections within the transmission system 1100, resulting in information distortion or information loss.

Figure 12:
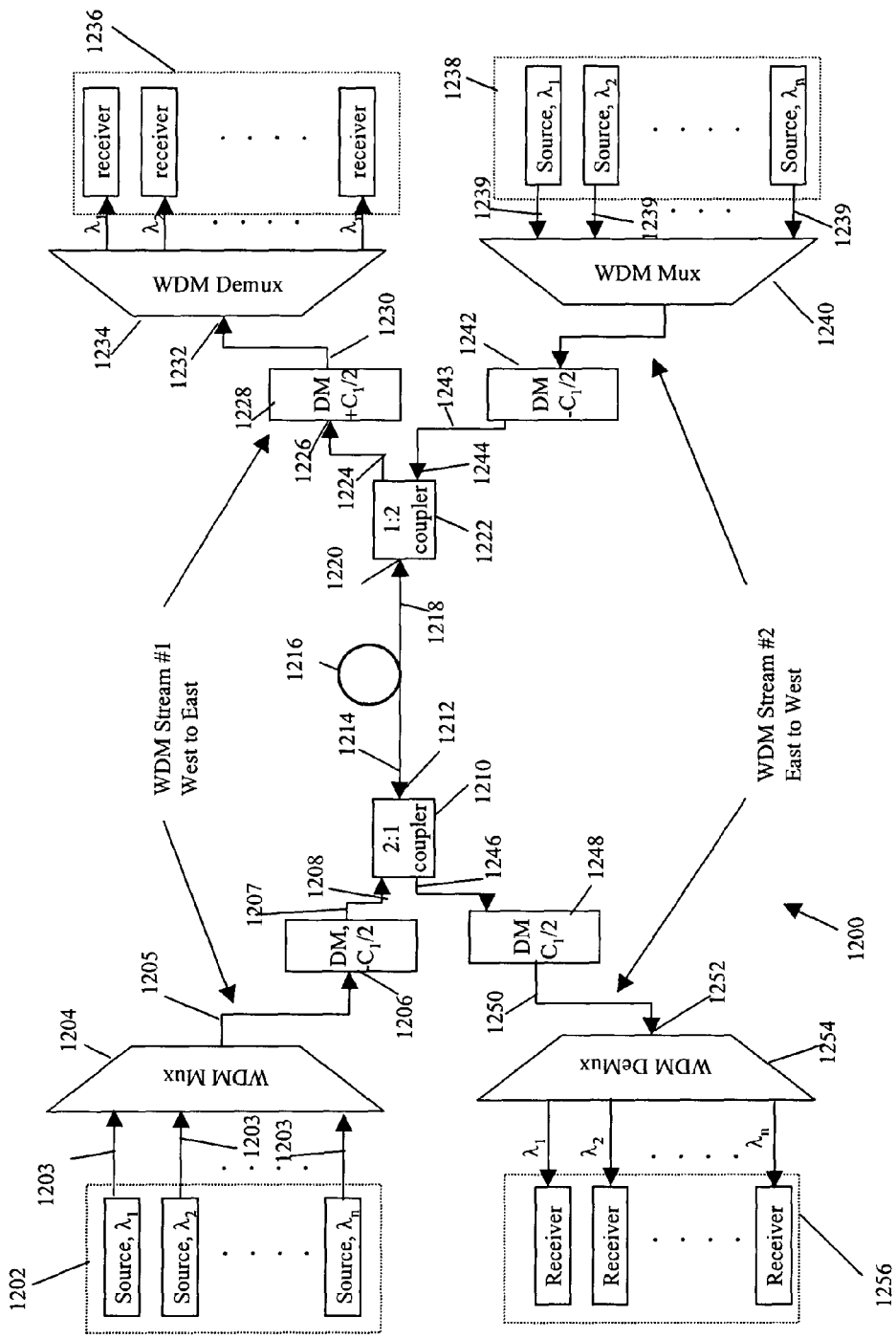
FIG. 12 shows a block diagram of bi-directional dispersion multiplexed WDM streams, according to an embodiment of the invention.

FIG. 12 shows an embodiment of the invention that overcomes the above-named shortcomings of a bi-directional transmission system such as that of FIG. 11. A first set of sources 1202 produces a set of modulated spectra $\lambda_1, \ldots, \lambda_n$, that are input to a first WDM multiplexer 1204, an output 1205 of which is input to a first dispersion module 1206, comprising a negative linear characteristic curve of slope $(-C_1/2)$. A first signal 1207 output from the first dispersion module 1206 comprises a processed first set of modulated spectra, in which each of the respective modulated spectra has been processed so that the wavelength-integrated amplitude of each of the respective modulated spectra is substantially constant in time. The first signal 1207 is input into a first port 1208 of a first coupler 1210. A second port 1212 of the first coupler 1210 is coupled to a first end 1214 of a transmission waveguide 1216; a second end 1218 of the transmission waveguide 1216 is coupled to a first port 1220 of a second coupler 1222.

The first signal 1207 propagates through the transmission waveguide 1216, into the second coupler 1222, which is coupled to an input 1226 of a second dispersion module 1228. The second dispersion module 1228 comprises a positive linear characteristic curve of slope $(+C_1/2)$, the inverse transfer function of the first dispersion module 1206. An output 1230 of the second dispersion module 1228 is the first multiplexed set of modulated spectra 1205 $\lambda_1, \ldots, \lambda_n$, each of which may include a d.c. offset that is constant in time, the d.c. offset resulting from signals that were not processed through the first dispersion module 1206. The output 1230 is fed to an input 1232 of a first WDM de-multiplexer 1234, which outputs each of the individual modulated spectra 1203 $\lambda_1, \ldots, \lambda_n$, into a respective receiver within a set of receivers 1236. Each respective receiver decodes the respective information encoded on a respective spectrum $\lambda_1, \ldots, \lambda_n$.

A second set of sources 1238 produces a set of modulated spectra 1239 $\lambda_1, \ldots, \lambda_n$ (in this illustration, the carrier spectra $\lambda_1, \ldots, \lambda_n$ are identical to those of the first set of sources 1202; in general the sources may be different from those of sources 1202) input to a second WDM multiplexer 1240, the output of which is input to a third dispersion module 1242, comprising a negative linear characteristic curve of slope $(-C_1/2)$. A signal 1243 output from the third dispersion module 1242 comprises a processed second set of modulated spectra, in which each of the respective modulated spectra has been processed so that the wavelength-integrated amplitude of each of the respective modulated spectra is substantially constant in time; hence the wavelength-integrated amplitude of the total signal is constant in time. The signal 1243 is input into a third port 1244 of the second coupler 1222. The signal 1243 is output through the first port 1220 of the second coupler 1222 to the second end 1218 of the transmission waveguide 1216, and propagates to the second port 1212 of the first coupler 1210. The signal 1243 is output through a third port 1246 of the first coupler 1210, and input to a fourth dispersion module 1248. The fourth dispersion module 1248 comprises a positive linear characteristic curve of slope $(+C_1/2)$, the inverse transfer function of the third dispersion module 1242. The output 1250 of the fourth dispersion module 1248 comprises the second set of modulated spectra $\lambda_1, \ldots, \lambda_n$, each of which may include an offset that is constant in time. The fourth dispersion module 1248 is coupled to an input 1252 of a second WDM de-multiplexer 1254, which outputs each of the individual modulated spectra 1239 of the second set of modulated spectra into a respective receiver within a set of receivers 1256. Each respective receiver decodes the respective information encoded on a respective spectrum. In this embodiment, although modulated spectra comprising different data encoded on identical respective carrier spectra $\lambda_i$, are travelling in opposite directions on the same waveguide, dispersion multiplexing and de-multiplexing prevents interference between signals of identical carrier spectrum from occurring.

Having illustrated and described the principles of the invention in the above-described embodiments, it should be apparent to those skilled in the art that the embodiments can be modified in arrangement and detail without departing from such principles. In view of the many possible embodiments to which the presented may be applied, it should be recognized that the illustrated embodiments are only examples of the invention and should not be taken as a limitation on the scope of the invention. Rather, the invention is defined by the following claims. It is therefore claimed as the invention all such embodiments that come within the scope and spirit of these claims.

What is claimed is:

1. A method comprising:
  modulating a first optical signal with a first data stream to produce a first modulated spectrum;
  applying a propagation delay to each wavelength component of the first modulated spectrum to produce a processed first modulated spectrum having a total signal amplitude that is substantially constant over time, the propagation delay substantially linearly related to wavelength by a first slope;

modulating a second optical signal with a second data stream to produce a second modulated spectrum;

applying a propagation delay to each wavelength component of the second modulated spectrum to produce a processed second modulated spectrum having a total signal amplitude that is substantially constant over time, the propagation delay substantially linearly related to wavelength by a second slope;

combining the processed first modulated spectrum with the processed second modulated spectrum to produce a combined signal;

dividing the combined signal into a first portion and a second portion;

applying a propagation delay to each wavelength component of the first portion of the combined signal, the propagation delay substantially linearly related to wavelength by a slope that is an inverse of the first slope, to produce a first output signal substantially comprising the first modulated spectrum and a substantially constant offset; and applying a propagation delay to each wavelength component of the second portion of the combined signal, the propagation delay substantially linearly related to wavelength by a slope that is an inverse of the second slope, to produce to produce a second output signal substantially comprising the second modulated spectrum and a substantially constant offset.

2. The method of claim 1, further comprising:

decoding the first output signal to obtain the first data stream; and decoding the second output signal to obtain the second data stream.

3. The method of claim 2, wherein the first data stream comprises two or more multiplexed data streams.

4. The method of claim 1, wherein the first data stream comprises two or more multiplexed data streams.

5. The method of claim 4, wherein the two or more multiplexed data streams are multiplexed according to Wavelength Division Multiplexing (WDM).

6. The method of claim 4, wherein the two or more multiplexed data streams are multiplexed according to Dense Wavelength Division Multiplexing (DWDM).

* * * * *